T. H. ROBERTS.
Tube-Welding Machine.
No. 211,589. Patented Jan. 21, 1879.
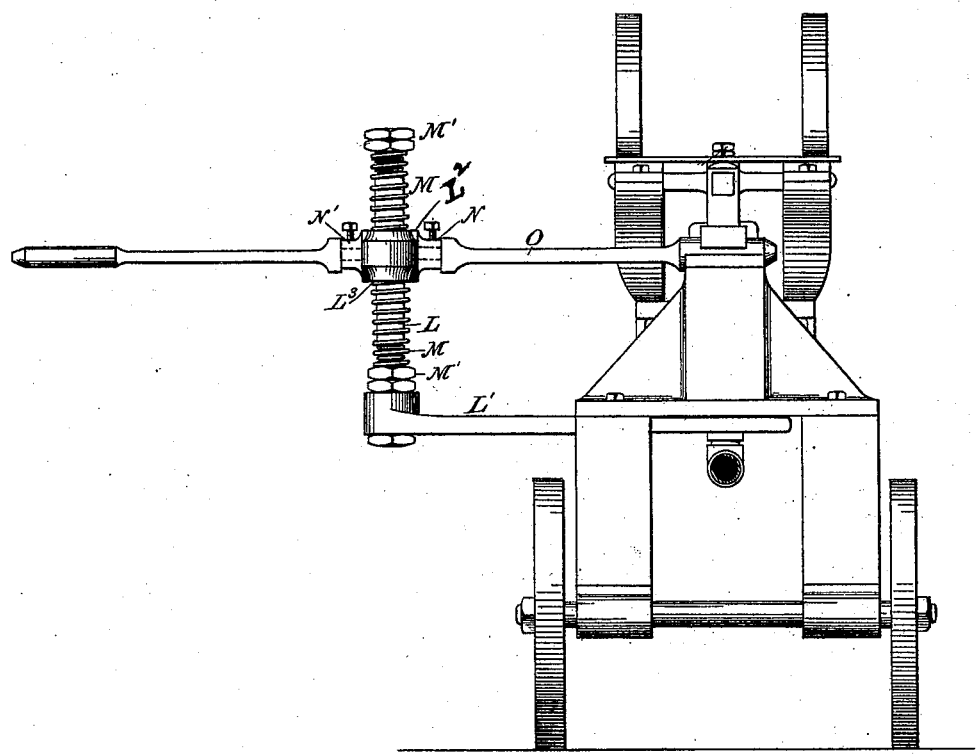
Witnesses:
C Clarence Poole
R. N. Dyer
Inventor:
Thomas H. Roberts,
by
Geo. N. Dyer & Co,
Atty.

UNITED STATES PATENT OFFICE.

THOMAS H. ROBERTS, OF STRATFORD, ONTARIO, CANADA.

IMPROVEMENT IN TUBE-WELDING MACHINES.

Specification forming part of Letters Patent No. 211,589, dated January 21, 1879; application filed February 7, 1878.

*To all whom it may concern:*

Be it known that I, THOMAS HERBERT ROBERTS, of the town of Stratford, in the county of Perth and Province of Ontario, Canada, mechanical engineer, have invented certain new and useful Improvements in Tube-Welding Machines; and I do hereby declare that the following is a full, clear, and exact description of the same.

My invention has relation more particularly to a mandrel attachment, to be used in connection with power-hammers for the purpose of welding metallic tubes; and my invention consists of a mandrel-head attached to a spindle connected, by a socket-joint in a detachable manner, to a block, which block is supported upon a vertical standard in an adjustable manner.

In the drawing is shown a front view of a tube-welding machine with my improvement attached.

L is the mandrel-standard, supported at a suitable distance from the anvil of a tube-welding machine by the bar $L^1$. The mandrel-standard, at a point, $L^3$, opposite the center of the dies, is rectangular, the remaining portions upward and downward from this part being cylindrical. On this rectangular section the mandrel-block $L^2$ is fitted, being retained in place opposite to the center of the dies by spiral springs M M and adjusting locking-nuts $M'$. The block $L^2$ and attachments are therefore capable of adjustment up or down by the nuts $M'$, as desired, the force of the compressed springs holding it in place firmly, but not too rigidly.

N N' are sockets formed on the block, the former of which receives the end of the working mandrel-spindle O, while the latter receives the end of the spindle of a mandrel not in use, in order that the weight on each side of the standard may be balanced.

P is the mandrel proper, attached to the spindle O. The mandrel lies in a central position between the dies D and $F^2$, and is slightly less in diameter than the tube to be welded. A space, therefore—say, equal to the thickness of the tube metal—intervenes all around between the mandrel and the die-boxes.

The welding of tubes previous to the date of my invention has required the attendance of two men, one to handle the tube and the other to manage the mandrel.

With my mandrel attachment but one man is required, the mandrel being self-supporting, and held automatically in a manner that produces very superior work at a greatly-reduced cost for labor.

I claim as new and desire to secure by Letters Patent—

The fixed standard L $L^1$, with rectangular section $L^3$, adjustable block $L^2$, with mandrel-spindle sockets N N', spiral springs M, and adjusting and locking nuts $M'$, all combined and arranged substantially in the manner shown and described, and for the purpose specified.

T. H. ROBERTS.

Witnesses:
E. I. PARKINSON,
GEOR. JEMMISON.